United States Patent
Berlin (10) Patent No.: US 9,684,518 B2
(45) Date of Patent: *Jun. 20, 2017

(54) OPTION READ-ONLY MEMORY USE

(71) Applicant: Hewlett-Packard Development Company, L.P., Houston, TX (US)

(72) Inventor: Kimon Berlin, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/065,414

(22) Filed: Mar. 9, 2016

(65) Prior Publication Data

US 2016/0188347 A1 Jun. 30, 2016

Related U.S. Application Data (63) Continuation of application No. 14/344,005, filed as application No. PCT/US2011/054337 on Sep. 30, 2011, now Pat. No. 9,286,468.

(51) Int. Cl.
*G06F 9/24* (2006.01)
*G06F 15/177* (2006.01)
(Continued)

(52) U.S. Cl.
CPC .......... *G06F 9/4406* (2013.01); *G06F 3/0604* (2013.01); *G06F 3/065* (2013.01); *G06F 3/0619* (2013.01); *G06F 3/0632* (2013.01); *G06F 3/0679* (2013.01); *G06F 9/4411* (2013.01); *G06F 9/4415* (2013.01); *G06F 21/51* (2013.01); *G06F 21/575* (2013.01); *G06F 11/0793* (2013.01); *G06F 11/1417* (2013.01); *G06F 11/1433* (2013.01); *G06F 21/572* (2013.01);
(Continued)

(58) Field of Classification Search
CPC ................ G06F 21/79; G06F 11/0793; G06F 2221/2105; G06F 11/1417; G06F 11/1433; G06F 21/575; G06F 21/572; G06F 2211/1097
USPC ................................................ 713/1, 2, 100
See application file for complete search history.

(56) References Cited

U.S. PATENT DOCUMENTS

| 5,327,531 A | 7/1994 | Bealkowski et al. |
| 6,711,675 B1 | 3/2004 | Spiegel et al. |
| (Continued) | | |

FOREIGN PATENT DOCUMENTS

| CN | 1416545 | 5/2003 |
| CN | 1707442 | 12/2005 |
| (Continued) | | |

OTHER PUBLICATIONS

Hendricks, J. et al., Secure Bootstrap is Not Enough: Shoring Up the Trusted Computing Base, http://www.pdl.cmu.edu/PDL-FTP/associated/sigops04-bootstrap.pdf, 5 pp, Sep. 2004.
(Continued)

*Primary Examiner* — Michael J Brown
(74) *Attorney, Agent, or Firm* — HP Inc. Patent Department (57) ABSTRACT

Example embodiments disclosed herein relate to altered option read-only memory. A copy of an option read-only memory is stored. The copy is used during a boot process based on a determination that the option read-only memory has been altered.

13 Claims, 4 Drawing Sheets

(51) Int. Cl.
   *G06F 9/44* (2006.01)
   *G06F 21/51* (2013.01)
   *G06F 3/06* (2006.01)
   G06F 21/79 (2013.01)
   G06F 11/14 (2006.01)
   G06F 11/07 (2006.01)
   G06F 21/57 (2013.01)

(52) U.S. Cl.
   CPC ...... *G06F 21/79* (2013.01); *G06F 2211/1097* (2013.01); *G06F 2221/2105* (2013.01)

(56) References Cited

U.S. PATENT DOCUMENTS

| | | | |
|---|---|---|---|
| 9,286,468 B2 * | 3/2016 | Berlin | G06F 9/4411 |
| 2003/0229777 A1 | 12/2003 | Morais et al. | |
| 2005/0132206 A1 | 6/2005 | Palliyil et al. | |
| 2007/0277241 A1 | 11/2007 | Repasi et al. | |
| 2008/0082833 A1 * | 4/2008 | Lewis | G06F 21/572 |
| | | | 713/189 |
| 2008/0289038 A1 | 11/2008 | Kim et al. | |
| 2009/0144582 A1 | 6/2009 | Li et al. | |
| 2010/0199272 A1 | 8/2010 | Mahajan et al. | |
| 2010/0204650 A1 * | 8/2010 | Hungerford | A61M 5/1407 |
| | | | 604/151 |
| 2010/0211767 A1 | 8/2010 | Chu et al. | |

FOREIGN PATENT DOCUMENTS

| | | |
|---|---|---|
| CN | 1991779 | 7/2007 |
| EP | 1914749 A1 | 4/2008 |

OTHER PUBLICATIONS

International Searching Authority, Appl No. PCT/US2011/054337, filed Sep. 30, 2011, Search Report and Written Opinion, 9 pp, dated May 7, 2012.

Thibadeau, R., "Why All Drives Should Be Self-Encrypting," http://www.flashmemorysummit.com/English/Collaterals/Proceedings/2011/20110808_PreConf_FSpm_Thibadeau.pdf, 23 pp, 2011.

* cited by examiner

OPTION READ-ONLY MEMORY USE

CROSS-REFERENCE TO RELATED APPLICATION

This application is a continuation of U.S. patent application Ser. No. 14/344,005 with a 371(c) date of Mar. 10, 2014 and entitled "OPTION READ-ONLY MEMORY USE," which is a U.S. National Stage Application of and claims priority to International Patent Application No. PCT/US2011/054337, filed on Sep. 30, 2011, and entitled "OPTION READ-ONLY MEMORY USE," all of which are hereby incorporated by reference in their entirety.

BACKGROUND

When a computer is started up, the computer generally is booted via a boot process. The boot process may be implemented using a firmware interface, such as a basic input/output system (BIOS) or Extensible Firmware Interface (EFI). Part of the boot process includes initializing and/or identifying system devices such as a keyboard, a mouse, a display adapter, etc.

BRIEF DESCRIPTION OF THE DRAWINGS

The following detailed description references the drawings, wherein.

DETAILED DESCRIPTION

Computing devices can be initialized using a boot process. The boot process can be implemented using a firmware interface such as a basic input/output system (BIOS), an Extensible Firmware Interface (EFI), or other firmware interfaces. During the boot process, the firmware interface can set up the hardware of the computing device. Further, the firmware interface can be responsible for loading or initiating a boot loader to transfer the operation of the computing device to an operating system.

When booting a computing device, the firmware interface initializes and identifies system devices or adapter cards such as a display adapter, a keyboard, a mouse, storage (e.g., hard drives, flash drives, optical disk drives, etc.), network adapters, other hardware, etc. When initializing some of these devices, the computing device can execute an option read-only memory (ROM). An option ROM can be considered a component ROM or firmware located on an adapter card. In certain examples, a ROM is a class of storage medium used in the computing device that cannot be modified or can be modified slowly or with difficulty. The BIOS or other firmware interface of the system board of the computing device can call the option ROM in the adapter card (e.g., a video card, a sound card, a storage card, etc.).

As used herein, a ROM can include a mask ROM, erasable programmable read-only memory (EPROM), electrically erasable programmable read-only memory (EEPROM or Flash ROM), or the like. A ROM can be used to distribute firmware of the computing device. The firmware can include instructions and other information that can be executed by at least one processor.

Further, the firmware of the option ROM can be used to set up and/or utilize respective system devices and/or adapter cards. For example, a Video BIOS can be initiated to initialize a video adapter to allow a user to view messages from the firmware interface, operating systems, etc. During the boot process, the primary firmware interface can cause a processor of the computing device to retrieve information from the option ROM to execute on a processor.

There has been a growing trend of firmware-based attacks on computing devices because altered firmware is difficult to detect by an antivirus program and firmware has potential control over the entire computing system. Malware can infect an adapter card connected to the computing system, in a manner similar to upgrading the firmware on the adapter card. For ease of use, many adapter cards today allow for the firmware to be upgraded using software executing on an Operating System of the computing system. As such, malware may be able to infect the adapter card's option ROM by modifying the firmware on the adapter card. In some examples, video option ROMs are one of the first pieces of code executed once a computing device is powered on or reset. This can be so that a user can receive messages from the firmware and for communication purposes. As such, if the option ROM includes malware, it can be difficult to recognize as well as difficult to repair because the malware may take steps to hide the malware. Protections for a computing system made by a manufacturer can be supplanted by malware attacking add in cards that may have less security.

Accordingly, various embodiments disclosed herein relate to saving a known good backup copy of an option ROM of an adapter card to storage. Then, on subsequent boot ups of the computing device, before code from the option read only memory is executed, information contained in the option ROM can be compared to the backup copy to determine whether the option ROM has been changed since it was backed up. The determination can be based on a comparison of a hash of the backup copy and a hash of the current option ROM or via a direct comparison of the backup copy and the information in the current option ROM. In certain embodiments, if the option ROM has been changed, the firmware interface can load the backup copy during the boot process. Automatically reverting to using the backup copy can be advantageous because features of a device or devices associated with the option ROM in question can be used. For example, in the case of a video option ROM, a display can be driven or in the case of a storage controller option ROM, storage can be detected and used.

Further, the computing device can ask a user to confirm that the alteration of the option ROM was intentional. If the change was unintentional, a hash associated with the option ROM can be blacklisted so that when the option ROM includes information that is associated with the hash, the option ROM is not executed. Instead, the backup ROM is executed until the option ROM is altered again and the user confirms that the alteration was intentional. Because an unauthorized change in an option ROM is not allowed to be executed, any malware that may reside in the option ROM is also not executed.

Figure 1A:
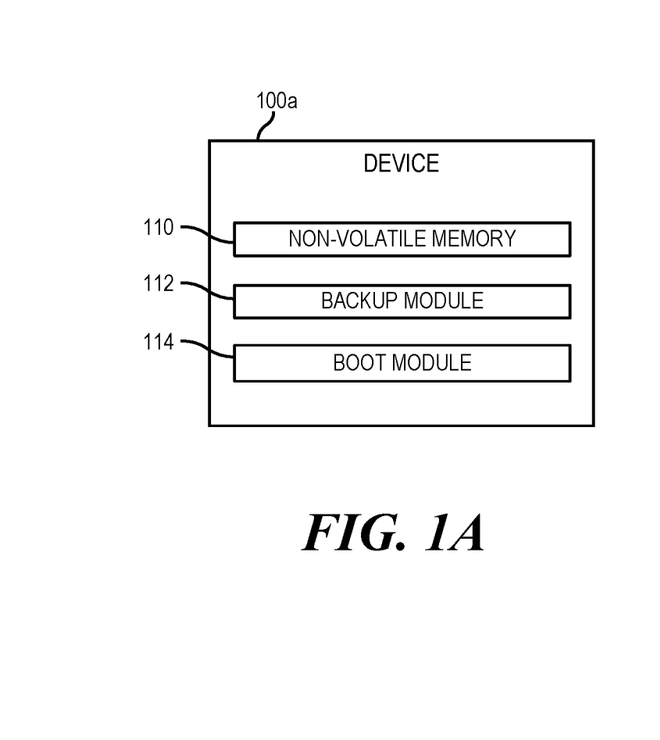
FIGS. 1A and 1B are block diagrams of devices capable of loading a backup copy of an option read only memory, according to various examples.
Figure 1B:
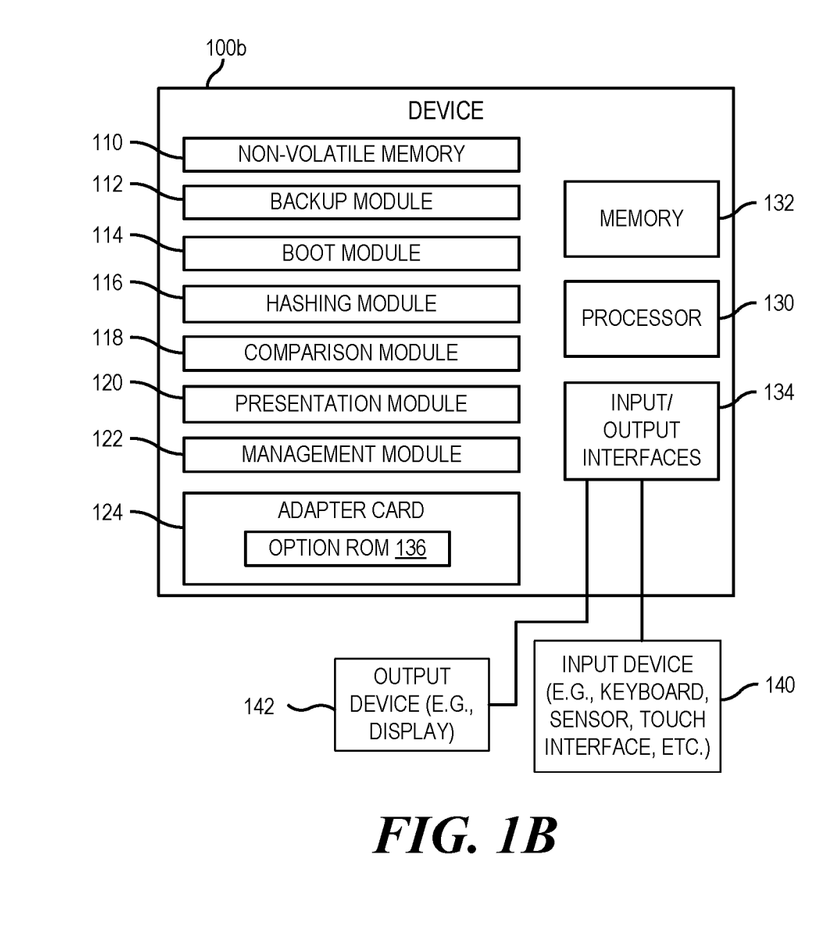

Referring now to the drawings, FIGS. 1A and 1B are block diagrams of devices capable of loading a backup copy of an option read only memory, according to various examples. Devices 100a, 100b include components that can be utilized to securely use and update option ROMs. The respective devices 100a, 100b may be a notebook computer, a desktop computer, a tablet computing device, a wireless device, a server, a workstation, or any other computing device. In one embodiment, the device 100 can include a non-volatile memory 110, a backup module 112, and a boot module 114. In other embodiments, a device 100b may also include a hashing module 116, a comparison module 118, a presentation module 120, a management module 122, an adapter card 124 or multiple adapter cards 124, at least one processor 130, memory 132, and input/output interfaces 134.

The non-volatile memory 110 is computer memory that can retain stored information even when not powered. Examples of non-volatile memory include ROM, flash memory, hard disks, floppy disks, magnetic tape, optical discs, ferroelectric Random Access Memory (RAM) etc. In certain examples, the non-volatile memory 110 can be part of or be used to store the BIOS, EFI, or other firmware interface. In other examples, the non-volatile memory 110 can be part of other storage, for example, hard disks, etc. For example, the non-volatile memory 110 can be part of a hard disk connected via an adapter card 124. In certain examples the adapter card 124 can be a storage controller card that can include an option ROM 136 capable of providing code to initialize the adapter card 124 to provide access to the hard disk and/or other storage. The non-volatile memory 110 can be represented as multiple different memory chips or memory devices.

In certain examples, the adapter card 124 is a printed circuit board that can be connected to a bus connected to a processor of the device 100. The adapter can be native to the device 100 (e.g., part of a system board of the device 100) or an expansion card that can be inserted to an expansion slot or connector (e.g., via a Universal Serial Bus (USB), via a Peripheral Component Interconnect (PCI) bus, etc.) of the system board. For example, a video adapter may be onboard or connected to an expansion bus. Examples of adapter cards 124 include video cards, storage adapter cards such as Small Computer System Interface (SCSI) cards or Serial Advanced Technology Attachment (SATA) expansion cards, network adapters, sound cards, other interface cards, etc.

The adapter cards 124 can include an option ROM 136. In certain examples, an option ROM 136 is firmware associated with the adapter cards 124 that is called by the system firmware interface (e.g., BIOS). The firmware can be executed on a central processor 130 of the device 100 once called. As noted above, firmware on an option ROM can be the target of malware. In certain examples, malware is malicious software designed to disrupt or deny operation, gather information that leads to loss of privacy or exploitation, gain unauthorized to system resources, or other abusive behavior. Examples of malware include computer viruses, worms, Trojan horses, spyware, dishonest adware, or other malicious or unwanted software or program.

The backup module 112 can cause storage of backup data of the option ROM 136 of the adapter card 124 at a storage location of the non-volatile memory 110. This can occur as part of a manual backup process, as a process that automatically occurs when a new adapter card 124 is detected, as a process that occurs routinely, or the like. The backup module 112 can cause the processor 130 to read an option ROM 136 and then store backup data of the option ROM 136 in the non-volatile memory 110. In certain scenarios, the backup data is an exact duplicate of the option ROM 136. Further, during the backup, a hashing module 116 can generate a hash value for the backup data and/or the option ROM 136. The hash value can be based on a cryptographic hash function. This information can be stored in another location of the non-volatile memory 110. When the backup of the option ROM 136 is stored, other information identifying the adapter card (e.g., using a hardware identifier) can be stored. As such, backups can be associated with particular adapter cards 124 and/or respective option ROMs 136.

In future boot ups of the device 100, the boot module 114 can check whether the option ROM 136 has been altered. As such, the boot module 114 determines whether data that is subsequently/currently stored at the option ROM 136 matches the backup data stored at the storage location. The boot process can use the comparison module 118 to make the determination. The comparison module 118 can compare the backup data with the current contents of the option ROM 136 or a hash value of the backup data and a hash value associated with the current option ROM contents. In some examples, the current contents of the option ROM 136 can be considered the contents of the option ROM 136 during boot time. In the case of the hash value comparison, the hashing module 116 can generate another hash value for the current option ROM data that is stored at the time the option ROM 136 is checked. If the comparison of the hash values or a direct comparison of the contents of the backup data and the current contents of the option ROM 136 do not match, the data in the option ROM 136 can be considered altered. If the option ROM 136 is altered, the boot module 114 can initialize the adapter card 124 using the backup data. In this scenario, information in the option ROM 136 is not called to be executed. As such, possible malware is not executed by the processor 130.

In certain scenarios, a change in the option ROM 136 is intentional (e.g., based on a firmware upgrade). As such, the presentation module 120 can be used to present a notification that the current contents of the option ROM 136 does not match the backup data. Further, the presentation module 120 can present a prompt requesting whether the change in the option ROM 136 contents was intentional. The presentation can occur during a boot process, while firmware is being executed, or using a tool that has access to firmware. In this scenario, the backup contents are used during the first time the device 100 is booted after a modification and can be used instead of the option ROM 136 contents unless the change is confirmed to be valid. With this approach, the device 100 can run as usual without losing functionality of the adapter card 124 associated with the option ROM 136 while the confirmation is being sought.

The management module 122 can be used to allow a user to securely determine whether the change in the option ROM 136 was intentional. As such, in response to the prompt, the management module 122 can receive an indication as to whether the change in the information was intentional or unintentional. If the change is determined to be intentional, a backup of the current contents of the option ROM 136 can be made and future boots can use the option ROM 136 because the backup and the option ROM 136 match. If the change is indicated to be unintentional, the management module 122 can cause storage and store a hash value of the current contents of the option ROM 136. This hash value can be used to represent that the contents of the option ROM 136 is blacklisted. As such, during subsequent boots of the device 100, the boot module 114 uses the unchanged backup data to initialize the adapter card 124 until a hash value of the option ROM 136 does not match the blacklisted hash value.

A processor 130, such as a central processing unit (CPU) or a microprocessor suitable for retrieval and execution of instructions and/or electronic circuits can be configured to perform the functionality of any of the modules 112-122 described herein. In certain scenarios, instructions and/or other information, such as hash value information, can be included in the non-volatile memory, memory 132 or other memory. Further, in certain examples, the memory 132 can include volatile memory such as Random Access Memory (RAM). Input/output interfaces 134 may additionally be provided by the device 100b. For example, input devices 140, such as a keyboard, a sensor, a touch interface, a mouse, a microphone, etc. can be utilized to receive input from an environment surrounding the device 100b. Further, an output device 142, such as a display, can be utilized to present information to users. Examples of output devices include speakers, display devices, amplifiers, etc. Moreover, in certain embodiments, some components can be utilized to implement functionality of other components described herein.

Each of the modules 112-122 may include, for example, hardware devices including electronic circuitry for implementing the functionality described herein. In addition or as an alternative, each module 112-122 may be implemented as a series of instructions encoded on a machine-readable storage medium of device 100 and executable by processor 130. It should be noted that, in some embodiments, some modules are implemented as hardware devices, while other modules are implemented as executable instructions.

In certain examples, the hash values can be stored in a system flash (e.g., where BIOS or other firmware is stored) as well as backups of other option ROMs. In other examples, option ROM backups used before interaction between a user and the system is possible (e.g., backups to video option ROMs) can be stored in the system flash while other backup copies can be stored at another non-volatile memory 110, such as a mass storage device. In some examples, the storage controller option ROM leading to the mass storage device can be considered used before interaction between a user and the system is possible. Management services can also be used to keep the system flash from being filled. For example, a prioritization scheme can be used to manage backups. As such, backups of option ROMs of adapter cards 124 that are necessary for the option ROM security system to be utilized (e.g., video, possibly the storage controller, etc.) can receive priority in being stored at the system flash. Further, the system flash can be managed in a manner such that when an adapter card is removed, the space associated with the adapter card's backup can be reclaimed and reused, for example, using a least recently used scheme.

Figure 2:
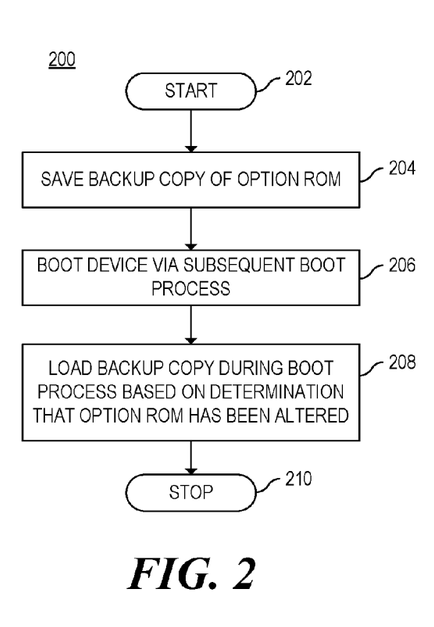
FIG. 2 is a flowchart of a method for loading a backup copy of an option read only memory, according to one example.

FIG. 2 is a flowchart of a method for loading a backup copy of an option read only memory, according to one example. Although execution of method 200 is described below with reference to device 100, other suitable components for execution of method 200 can be utilized (e.g., computing device 500). Method 200 may be implemented in the form of executable instructions stored on a machine-readable storage medium, such as storage medium 520, and/or in the form of electronic circuitry. In certain examples, the processes performed by some modules or devices can be performed by other modules or devices or in combination with other modules or devices.

Method 200 may start at 202 where the device 100 can be in a state where a backup utility is executing. The backup utility can be part of an operating system, part of a firmware interface, part of a boot process, or the like. The method 200 may proceed to 204, where a backup module 112 of the device 100 saves a backup copy of an option ROM of an adapter card to storage. Examples of option ROMs of the adapter card 124 include a video option ROM, a storage option ROM (e.g., a SCSI adapter), a network option ROM, etc. The storage can be non-volatile memory 110. The backup copy can be an exact copy of the option ROM. As such, a cryptographic hash of the backup copy and the option ROM can be the same.

At a later time (at 206), the device 100 can be started and booted via a subsequent boot process. When booted, a firmware interface of the device 100 (e.g., BIOS, EFI, etc.) initiates the boot process. During the boot process, the firmware interface can look to initialize the adapter card associated with the option ROM.

At 208, the boot module 114 loads the backup copy during the boot process based on a determination that the option ROM has been altered. The determination can be based on a comparison of the option ROM in its current state and the backup copy. Additionally or alternatively, the determination can be based on a comparison of respective hash values of the option ROM and the backup copy as further detailed in FIG. 3. At 210, the method 200 stops. Other boot processes and processes of the device 100 may continue. Moreover, the boot process can provide control of the device 100 to an operating system. Further, in certain scenarios, the presentation module 120 can drive a display to present a notification that the option ROM has been altered and/or that the backup copy has been used.

Figure 3:
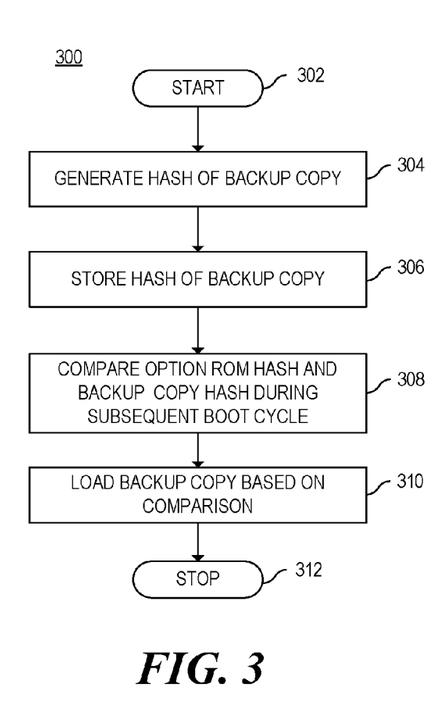
FIG. 3 is a flowchart of a method for loading a backup copy of an option read only memory based on a hash value comparison, according to one example.

FIG. 3 is a flowchart of a method for loading a backup copy of an option read only memory based on a hash value comparison, according to one example. Although execution of method 300 is described below with reference to device 100, other suitable components for execution of method 300 can be utilized (e.g., computing device 500). Method 300 may be implemented in the form of executable instructions stored on a machine-readable storage medium, such as storage medium 520, and/or in the form of electronic circuitry. In certain examples, the processes performed by some modules or devices can be performed by other modules or devices or in combination with other modules or devices.

Method 300 may start at 302, where the device 100 can be in a state where a backup utility is executing. As noted above, the backup module 112 can store a backup copy of an option ROM. At 304, the hashing module 116 can generate a hash for the backup copy. In some examples, the hash value can be a hash of the contents of the option ROM because the contents of the option ROM should be equivalent to the information stored as the backup copy. In certain examples, the hash value can be a cryptographic hash value based on a cryptographic hash function. A cryptographic hash function is a deterministic procedure that takes a block of data (e.g., the contents of the option ROM or backup copy) and returns a fixed-size bit string, that is, the hash value in a manner such that an intentional or accidental change to the data will change the hash value. Then, at 306, the backup module 112 can cause storage of the hash value of the backup copy in storage (e.g., the non-volatile memory 110).

The device 100 can continue to execute. At a subsequent boot cycle, the hash value of the backup copy of the option ROM can be compared to the hash value of the current contents of the option ROM (308). In certain scenarios, a subsequent boot cycle can be started once the system is reset or the system is powered on from an off state. As such, the current contents of the option ROM can be processed by the cryptographic hash function to yield a current option ROM hash value. The current option ROM hash value can be compared to the hash value of the backup copy during the boot cycle. This can be done to ensure that changes have not been made to the option ROM since the backup was made. As noted above, changes can be indicative of malware. If the hash values are the same, the option ROM is loaded. If the hash values are not the same, at 310, the backup copy of the option ROM is loaded in place of the loading of the option ROM. As noted, the option ROM can be used to initialize use of the adapter card 124 and/or to interface with the adapter card 124. Then, at 312, the method 300 stops. The loading can be performed automatically without user input. In some scenarios, the loading of the option ROM can also be based on user input, for example, user input indicating whether the change in the option ROM is intentional. This option may not be available for certain types of option ROMs. For example, in the case of a video option ROM, because a user would not be able to see a query for information, the backup video option ROM can be loaded automatically. As such, queries can be posted to a user after the backup copy of the option ROM has been used.

Figure 4:
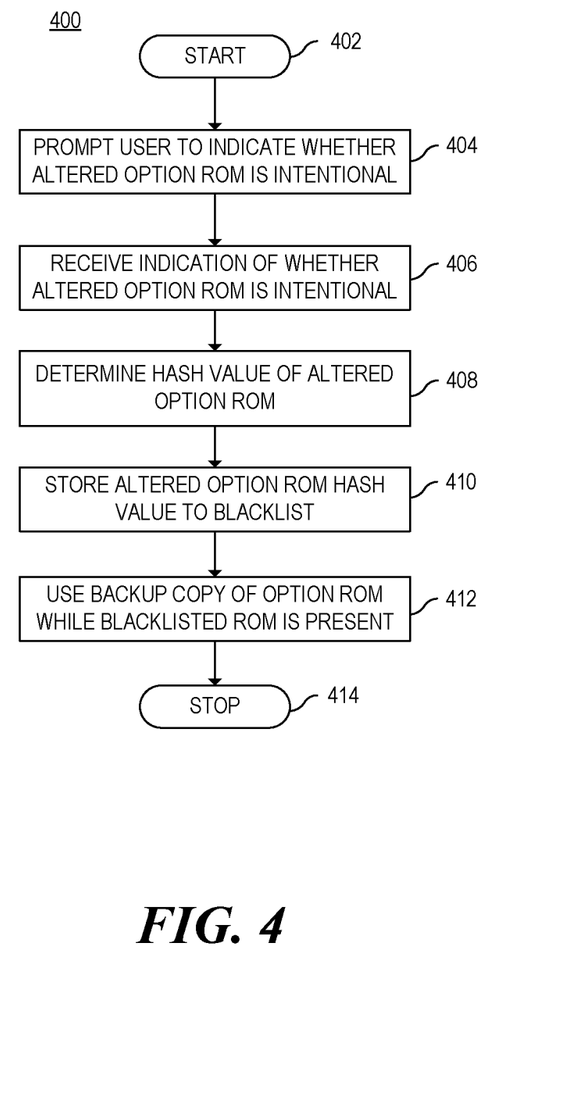
FIG. 4 is a flowchart of a method for blacklisting an option read only memory, according to one example.

FIG. 4 is a flowchart of a method for blacklisting an option read only memory, according to one example. Although execution of method 400 is described below with reference to device 100, other suitable components for execution of method 400 can be utilized (e.g., computing device 500). Method 400 may be implemented in the form of executable instructions stored on a machine-readable storage medium, such as storage medium 520, and/or in the form of electronic circuitry. In certain examples, the processes performed by some modules or devices can be performed by other modules or devices or in combination with other modules or devices.

Method 400 starts at 402, where the device 100 is started and has proceeded in a boot process. The boot process can be in a state where the comparison module 118 has determined that the option ROM has been altered from a previous state. As noted above, the determination can be based on a comparison of hash values or the current value of the option ROM and a backup copy of the option ROM. The presentation module 120 can cause presentation of a notification that the option ROM has been altered.

The method 400 can proceed to 404, where the presentation module 120 can cause presentation of a prompt to a user of the device 100 to indicate whether the alteration to the option ROM was intentional. The user can respond to the prompt. At 406, the management module 122 receives an indication as to whether the alteration to the option ROM was intentional. If the indication reveals that the change was intentional, the option ROM can continue to be used. Further, a new backup copy of the option ROM can be generated and stored for later comparisons. In certain examples, the user can be prompted before the backup copy is loaded. In other examples, the backup copy can be loaded before the prompt is presented. If the indication yields that the change was unintentional, the method 400 proceeds to 408, where the device 100 determines a hash value for the current contents of the option ROM. The hash value can be generated at an earlier time, for example, if the hash value was used for the comparison.

At 410, the hash value of the current contents of the option ROM is stored at an address of non-volatile memory 110 associated with a blacklist. The blacklist can include hash values of known bad option ROMs. As such, during subsequent boots of the device 100, the blacklisted hash values are compared to the hash value of the then current option ROM. At 412, the backup copy of the option ROM is used while the hash value of the current option ROM is equal to one of the blacklisted hash values. In certain examples, the blacklist can continue to include more hash values based on user response to changed option ROMs. As such, the backup copy is used until the hash value of the current contents of the option ROM does not match the hash value of the blacklisted option ROM. At 414 the method 400 stops. The device 100 can continue to perform other functions.

Figure 5:
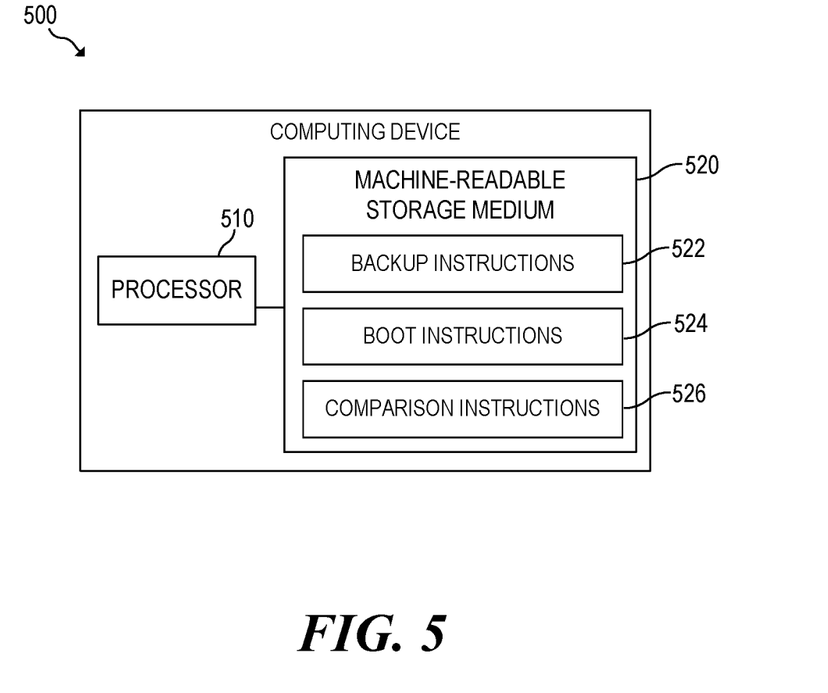
FIG. 5 is a block diagram of a computing device capable of booting a copy of an option read only memory based on a comparison, according to one example.

FIG. 5 is a block diagram of a computing device capable of booting a copy of an option read only memory based on a comparison, according to one example. The computing device 500 includes, for example, a processor 510, and a machine-readable storage medium 520 including instructions 522, 524, 526 for booting a copy of an option ROM based on whether the current option ROM has been altered. Computing device 500 may be, for example, a notebook computer, a slate computing device, a portable reading device, a wireless email device, a mobile phone, a server, a workstation, or any other computing device.

Processor 510 may be, at least one central processing unit (CPU), at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, or combinations thereof. Processor 510 may fetch, decode, and execute instructions 522, 524, 526 to implement the processes of FIGS. 2, 3, and 4. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for saving a copy of data of an option ROM that can later be used instead of the option ROM if the contents of the option ROM are altered. In one example, the machine-readable storage medium 520 can include a BIOS or other firmware interface. Further, in certain examples, the machine-readable storage medium 520 can include storage for one or more hashes and/or backup option ROM data. Moreover, in certain scenarios, multiple machine-readable storage mediums 520 can be included in the computing device 500. Each of the machine-readable storage mediums 520 may be used to store information.

The backup instructions 522 can execute as part of a backup utility to save the contents of an option ROM. Multiple option ROMs can be saved and utilized in this manner. The backup instructions 522 can cause the processor 510 to save a copy of the data of the option ROM of an adapter card to a non-volatile storage location. Moreover, a hash value of the option ROM and/or the copied data can be stored. The hash value of the option ROM can be the same as the copied data.

When the computing device 500 is later booted, boot instructions 524 can be executed by the processor 510 to initialize the components of the computing device 500. The boot process can initialize one or more adapter cards using respective option ROMs. In certain scenarios, the option ROM that was copied can be checked to determine whether the option ROM has been altered. As such, during the boot process, the processor 510 can fetch and read the option ROM to retrieve the subsequent or current data that is stored at boot time at the option ROM. In this embodiment, subsequent data refers to data residing in the option ROM during the boot process.

The comparison instructions 526 can execute on the processor 510 to determine whether the subsequent data stored at boot time is different from the copy data. As previously noted, this can be based on hash values or a direct comparison of the copy data and the contents of the option ROM. If the processor 510 executing the comparison instructions 526 determines that the subsequent data is different from the copy data, the copied data is used to initialize the adapter card. This usage can be automatic based on the change or based, at least in part, on a query to a user of the change.

In one example, the computing device 500, during the boot process, can cause presentation indicating that the option ROM has been modified. The computing device 500 can also present, on a display, a prompt to a use to request that the user indicate whether the modification to the option ROM was intentional. If the response was that the change was intentional, the option ROM can continue to be used. Further, in certain examples, the backup data can be replaced by the contents currently in the option ROM.

In one example, the computing device 500 receives a response indicating that the modification was not intentional. In this example, the usage of the copied data instead of the option ROM can be further based on the received response. As discussed above, the option ROM may be blacklisted using a hash value associated with the option ROM.

Further, in some examples, the adapter cards can be monitored for changes in status. For example, the backup ROM associated with an adapter card can be deleted based on a determination that the adapter card has been removed from the computing device 500.

With the above approaches, security can be provided to a computing system using adapters that may include option ROMs. As such, the computing system can be used without executing possibly harmful code in option ROMs that have been modified. Further, with this approach, verified option ROM changes can be confirmed and used, thus allowing for secure upgrades of the option ROM. Moreover, current option ROMs can be used and need not be altered to implement these approaches.

What is claimed is:

1. A method comprising:
    detecting an adapter card comprising an option read only memory is newly added to a device;
    based on detecting the adapter card, retrieving contents of the option read only memory from the adapter card;
    saving, for the device, a backup copy of the contents of the option read only memory to storage;
    booting the device via a subsequent boot process; and
    loading the backup copy during the subsequent boot process based on a determination that the option read only memory has been altered;
    wherein, based on the option read only memory having been altered unintentionally, further:
        determining a hash value of the altered read only memory;
        storing the hash value;
        during subsequent boots of the device, comparing the hash value to a recent hash value of the option read only memory; and
        using the backup copy in subsequent boots of the device until the hash value does not match the recent hash value of the option read only memory.

2. The method of claim 1, further comprising:
    generating a hash value of the backup copy; and
    storing the hash value.

3. The method of claim 2, further comprising:
    generating another hash value of the option read only memory during the subsequent boot process; and
    comparing the other hash value to the hash value during the subsequent boot process,
    wherein the determination is based on the comparison.

4. The method of claim 1, further comprising:
    comparing, during the subsequent boot process, the option read only memory and the backup copy,
    wherein the determination is based on the comparison.

5. The method of claim 1, wherein the option read only memory is at least one of:
    a video option read only memory and a storage option read only memory.

6. The method of claim 1, further comprising:
    causing presentation of a notification that the option read only memory has been altered.

7. The method of claim 6, further comprising:
    prompting a user of the device to indicate whether the alteration to the option read only memory is intentional; and
    receiving an indication as to whether the alteration was intentional.

8. The method of claim 7, wherein the loading of the backup copy is further based on the indication.

9. A computing device comprising:
    a non-volatile memory;
    a backup module to:
        detect an adapter card comprising an option read only memory is newly added to the computing device, and
        based on detection of the adapter card, cause storage of backup data of the option read only memory at a storage location of the non-volatile memory;
    a boot module to:
        determine that other data subsequently stored at the option read only memory does not match the backup data stored at the storage location, and
        initialize the adapter card using the backup data based, at least in part, on the determination;
    a hashing module to generate a first hash value for the backup data and to generate a second hash value of the subsequently stored data; and
    a management module to:
        receive an indication that the change in the subsequently stored data is unintentional; and
        store the second hash value in the non-volatile memory, wherein during subsequent boots of the computing device the boot module uses the backup data to initialize the adapter card until the second hash value does not match a subsequent hash value of the option read only memory.

10. The computing device of claim 9, further comprising:
a comparison module to compare the first hash value with the second hash value,
wherein the determination is based on the comparison.

11. The computing device of claim 10, further comprising:
a presentation module to present a notification that the subsequently stored data does not match the backup data.

12. A non-transitory machine-readable storage medium storing instructions that, if executed by a processor of a device, cause the processor to:
save a copy of data of an option read only memory of an adapter card;
boot the device via a boot process;
during the boot process, read the option read only memory to retrieve subsequent data;
determine that the subsequent data is different from the copied data;
use the copied data to initialize the adapter card based on the determination; and
delete the copied data based on a determination that the adapter card has been removed;
wherein, based on the option read only memory having been modified unintentionally, further:
determine a hash value of the modified read only memory;
store the hash value;
during subsequent boots of the device, compare the hash value to a recent hash value of the option read only memory; and
use the saved copy in subsequent boots of the device until the hash value does not match the recent hash value of the option read only memory.

13. The non-transitory machine-readable storage medium of claim 12, further comprising instructions that, if executed by the processor, cause the processor to:
cause presentation indicating that the option read only memory has been modified during the boot process;
prompt a user to indicate whether the modification was intentional; and
receive a response indicating that the modification was not intentional,
wherein the use of the copied data to initialize the adapter card is further based on the response.

* * * * *